US008595270B2

(12) United States Patent  
Marmaros et al.

(10) Patent No.: US 8,595,270 B2  
(45) Date of Patent: Nov. 26, 2013

(54) ARTIFICIAL ANCHOR FOR A DOCUMENT

(75) Inventors: David P. Marmaros, Mountain View, CA (US); Benedict A. Gomes, Mountain View, CA (US); Krishna Bharat, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,293

(22) Filed: Sep. 29, 2011

(65) Prior Publication Data

US 2012/0054169 A1 Mar. 1, 2012

Related U.S. Application Data

(62) Division of application No. 12/508,936, filed on Jul. 24, 2009, which is a division of application No. 10/750,183, filed on Dec. 31, 2003.

(51) Int. Cl.  
*G06F 17/30* (2006.01)

(52) U.S. Cl.  
USPC ............................ 707/807; 707/736; 715/208

(58) Field of Classification Search  
USPC ............................ 707/706, 807, 736; 715/208  
See application file for complete search history.

(56) References Cited

U.S. PATENT DOCUMENTS

| | | | | |
|---|---|---|---|---|
| 5,905,991 A | * | 5/1999 | Reynolds | 715/234 |
| 5,930,474 A | * | 7/1999 | Dunworth et al. | 709/217 |
| 5,991,739 A | | 11/1999 | Cupps et al. | |
| 6,122,647 A | * | 9/2000 | Horowitz et al. | 715/205 |
| 6,418,441 B1 | | 7/2002 | Call | |
| 6,763,496 B1 | * | 7/2004 | Hennings et al. | 715/205 |
| 6,772,139 B1 | | 8/2004 | Smith | |
| 6,785,671 B1 | | 8/2004 | Bailey et al. | |
| 6,895,430 B1 | * | 5/2005 | Schneider | 709/217 |
| 7,404,142 B1 | | 7/2008 | Tischer | |
| 2001/0029527 A1 | | 10/2001 | Goshen | |
| 2002/0099697 A1 | | 7/2002 | Jensen | |
| 2003/0055812 A1 | | 3/2003 | Williams et al. | |
| 2003/0097357 A1 | | 5/2003 | Ferrari et al. | |
| 2003/0122873 A1 | | 7/2003 | Dieberger et al. | |
| 2003/0154221 A1 | | 8/2003 | Caronni et al. | |
| 2003/0196172 A1 | * | 10/2003 | Bates et al. | 715/513 |
| 2003/0226104 A1 | | 12/2003 | Blazejewski et al. | |
| 2003/0233224 A1 | | 12/2003 | Marchisio et al. | |
| 2004/0024788 A1 | | 2/2004 | Hill et al. | |
| 2007/0208669 A1 | * | 9/2007 | Rivette et al. | 705/59 |
| 2009/0157711 A1 | | 6/2009 | Baer et al. | |

OTHER PUBLICATIONS

Law in the Outer Limits?, Therese O'Donnell, 1997, pp. 1-7.*  
Dieberger, A., "Context Lenses—Document Visualization and Navigation Tools for Rapid Access to Detail," Proc. of 8th International Conf. of Human Computer Interactions, Jul. 9-13, 2001, pp. 545-552.  
Examiner's First Report on AU Patent Application No. 2004312923 dated Jun. 17, 2010, 3 pages.

(Continued)

*Primary Examiner* — Cam Truong  
(74) *Attorney, Agent, or Firm* — Fish & Richardson P.C.

(57) ABSTRACT

Methods, systems, and apparatus, including computer program products, for linking to an intra-document portion of a target document includes receiving an address for a target document identified by a search engine in response to a query, the target document including query-relevant text at an intra-document portion of the target document. An artificial anchor that corresponds to the intra-document portion is generated and appended the address.

21 Claims, 9 Drawing Sheets

(56) References Cited

OTHER PUBLICATIONS

Gronboek et al., "Designing Dexter-based Hypermedia Services from the World Wide Web", Hypertext '97; 8th ACM Conference on Hypertext, Apr. 6, 1997, pp. 146-156, vol. CONF. 8, ACM Conference on Hypertext, New York, US.

International Business Machines Corporation, "Positioning the browser at the answer sentence in a document", Research Disclosure, Mar. 2000, vol. 431, No. 193, Kenneth Mason Publications, Hampshire, GB.

International Search Report, PCT/US2004/043845, May 5, 2005, 4 pages.

Law in the Outer Limits? Therese O'Donnell, 1997, pp. 1-7.

Leuski A, Linc-I., Hovy E: "iNeATS: interactive multi-document summarization", Proceedings of the 41st Annual Meeting on Association for Computational Linguistics, Sapporo, Japan, Jul. 7-12, 2003, vol. 2, pp. 125-128, ISBN 978-0-11-145678-1, ISBN 0-11-145678-9, XP007911213, doi:10.3115/1075178.1075197.

Lawrence S, Giles CL: "Context and Page Analysis for Improved Web Search", IEEE Internet Computing, IEEE Service Center, New York, NY, US Oct. 31, 1998, pp. 38-46, XP002255811, ISSN 1089-7801, doi:10.1109/4236.707689.

Communication Pursuant to Article 94(3) EPC, for Application No. EP 04 815 841.4-2201, dated Jan. 26, 2010, 9 pages.

Manning, S. "Google Toolbar", retrieved from the internet on Jun. 20, 2002 [retrieved at: http://www.digitalsurvivors.com/archives/000424.php], [retrieved on Jan. 21, 2011], 3 pages.

Summons to attend oral proceedings pursuant to Rule 115(1) EPC, for Application No. EP 04 815 841.4-2201, dated Apr. 13, 2011, 12 pages.

Statement of Grounds for Notice of Appeal filed Feb. 6, 2013, for EP 04815841.4, 17 pages.

Third Office Action in CN Patent Application No. 201010145162.6 dated Mar. 5, 2013, w/English Translation, 18 pages.

\* cited by examiner

| | | | | | | |
|---|---|---|---|---|---|---|
| Pizza/Italian | [MENU] | PIZZA 3120 Del Monte Blvd. | MARINA, CA | | | |
| Pizza/Italian | [MENU] | ROUND TABLE PIZZA 1225 El Camino Real | MENLO PARK, CA | | | |
| Pizza/Italian | [MENU] | ROUND TABLE PIZZA 3350 Alameda de las Pulgas Waiter.com Corporate Delivery | MENLO PARK, CA | | | |
| Pizza/Italian | [MENU] | ROUND TABLE PIZZA 570 N. Shoreline Blvd. | MOUNTAIN VIEW, CA | | | |
| Pizza/Italian | [MENU] | ROUND TABLE PIZZA 157 E. El Camino Real | MOUNTAIN VIEW, CA | | | |
| Pizza/Italian | [MENU] | ROUND TABLE PIZZA 5544 Thornton | NEWARK, CA | | | |

FIG. 4

| | | | | | | |
|---|---|---|---|---|---|---|
| Pizza/Italian | [MENU] | ROUND TABLE PIZZA<br>4400 El Camino Real<br>Waiter.com Corporate<br>Delivery | LOS ALTOS, CA | 👍 | 🍴 | 🚚 |
| Pizza/Italian | [MENU] | ROUND TABLE PIZZA<br>3120 Del Monte Blvd. | MARINA, CA | 👍 | 🍴 | 🚚 |
| Pizza/Italian | [MENU] | ROUND TABLE PIZZA<br>1225 El Camino Real | MENLO PARK, CA | 👍 | 🍴 | 🚚 |
| Pizza/Italian | [MENU] | ROUND TABLE PIZZA<br>3350 Alameda de las Pulgas<br>Waiter.com Corporate<br>Delivery | MENLO PARK, CA | 👍 | 🍴 | 🚚 |
| Pizza/Italian | [MENU] | ROUND TABLE PIZZA<br>570 N. Shoreline Blvd. | MOUNTAIN VIEW, CA | 👍 | 🍴 | 🚚 |

FIG. 5

ARTIFICIAL ANCHOR FOR A DOCUMENT

RELATED APPLICATION

This application is a divisional application of U.S. application Ser. No. 12/508,936, filed on Jul. 24, 2009, and entitled "Artificial Anchor For A Document," which, in turn, is a divisional application of U.S. application Ser. No. 10/750,183, filed on Dec. 31, 2003 and entitled "Systems and Methods for Direct Navigation to Specific Portion of Target Document." The disclosures of U.S. application Ser. Nos. 12/508,936 and 10/750,183 are incorporated herein by reference.

BACKGROUND OF THE INVENTION

1. Field of the Invention

Systems and methods for direct navigation to and/or highlighting a specific portion of a target document such as query-relevant portion of the document are disclosed.

2. Description of Related Art

When a user searches for information on the Internet by submitting a query to a search engine, the search engine returns a results page that often provides several hyperlinks to web pages that may be relevant to the user's query. Under each hyperlink, the results page typically also provides query-relevant information or text, often referred to as "snippets," extracted from the webpage to which the corresponding hyperlink refers. When the user clicks on a desired hyperlink on the search results page, the client browser typically navigates to the top of the target or destination webpage (or other document such as a Word, Excel or Portable Document Format (PDF) document, for example) to which the hyperlink refers. However, the target webpage may be long and/or the search query terms may be buried deep within the webpage. To locate the desired search terms, the user may perform a search for the desired text from within the web browser and/or manually (visually) search for the relevant information by scrolling through the webpage.

As an example, to find pizza places in or near zip code 94043, the user may search for "pizza" at zip code 94043 using Google's "Searching by Location" search engine currently located at http:Nlabs.google.com/location (i.e., http://labs.google.com/location?q-pizza&geo~near=94043&Search=Google+Search) as shown in FIG. 1. An exemplary results page returned by the search engine is shown in FIG. 2 in which the first hyperlink 20 points to http://www.waiter.corn/roundtable, which contains a list of 35 pizza places in or near zip code 94043. In addition to the various hyperlinks, the search engine also provides a snippet 26 extracted from the webpage to which each hyperlink refers. As shown, certain text of each snippet 26 is in bold font so as to highlight certain text that may be useful as determined by the search engine. For the first hyperlink 20, the search engine highlights the text "Pizza 570 N. Shoreline Blvd. MOUNTAIN VIEW, Calif." of the snippet 26 in bold.

If the user clicks on the first-listed hyperlink 20, the client browser loads and displays the destination webpage 22 to which the hyperlink 20 refers at the top of the webpage 22, as shown in FIG. 3. However, the target document or webpage is typically not hosted or authored by the same entity as that of the search engine or other source or origin document such that the desired information is typically not propagated from the source document to the target document. Thus, for example, because the browser typically displays the webpage 22 at the top of the webpage 22, the restaurant that is in or closest to zip code 94043 may or may not be initially displayed within the browser. In the current example, the restaurant that is in or closest to zip code 94043, namely, the Round Table Pizza at 570 N. Shoreline Blvd. in Mountain View, Calif. is the tenth out of 35 listings on the destination webpage 22.

In order for the user to determine which of the listings is the most query relevant listing, the user can determine as the user scrolls through the 35 listings on the destination webpage 22 which of the listings is the one that is most relevant to the user's query, i.e., in or closest to zip code 94043. In the current example, the user must scroll down a number of screens before the query-relevant listing 24 is even displayed within the browser, as shown in FIG. 4. Alternatively, the user may take note of the content of the snippet 26 before navigating or clicking away from the results page (FIG. 2) and then search for (either visually by scrolling or by performing a text search from within the browser) the content of the snippet.

As is evident, each result on the search results page generated by the search engine only points to a webpage and not to anything more granular. In other words, the snippet generated by the search engine is only displayed to the user on the search results page and is not propagated or otherwise utilized to directly navigate to the desired location on the destination webpage.

SUMMARY OF THE INVENTION

Disclosed herein are apparatus, methods and systems for linking to an intra-document portion of a target document. In an implementation, a method includes receiving an address for a target document identified by a search engine in response to a query, the target document including query-relevant text that identifies an intra document portion of the target document, the intra-document portion including the query relevant text; generating an artificial anchor, the artificial anchor corresponding to the intra document portion; and appending the artificial anchor to the address. The artificial anchor can be undefined in the target document. Other embodiments of this aspect include corresponding systems, apparatus, and computer program products.

In another implementation, a method includes receiving a plurality of search results at a client device in response to a search query, each of the search results including a uniform resource locator identifying a corresponding target document and an artificial anchor corresponding to an intra-document portion of the corresponding target document, the intra-document portion including query-relevant text that identifies the intra document portion of the corresponding target document; in response to a selection of a search result from the search results at the client device, transmitting from the client device a request for the corresponding target document identified by the uniform resource locator included in the selected search result and receiving at the client device the corresponding target document in response to the request; and processing the artificial anchor included in the selected search result at the client device to cause the client device to display the corresponding intra-document portion of the corresponding target document. The artificial anchor can be undefined in the target document. Other embodiments of this aspect include corresponding systems, apparatus, and computer program products.

In still another implementation, a method includes receiving a search result page including a plurality of search results, each search result including a search result link pointing to a corresponding target document and a snippet extracted from an intra-document portion of the corresponding target document; for each search result, generating an intra-document link based on the snippet included in the search result by appending an artificial anchor to the search result link, the intra-document link pointing to the intra-document portion of the corresponding target document; and in response to a selection of one of the intra-document links, receiving the corresponding target document and navigating directly to the intra-document portion of the corresponding target document. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The present invention will be readily understood by the following detailed description in conjunction with the accompanying drawings, wherein like reference numerals designate like structural elements.

FIG. 4 is an illustrative client browser window displaying the webpage of FIG. 3 at a location that displays query-relevant information within the browser.

FIG. 5 is an illustrative client browser window displaying the webpage of FIG. 3 in which the display is automatically scrolled to the query-relevant information of the webpage and the query-relevant information highlighted.

DESCRIPTION OF THE SPECIFIC EMBODIMENTS

Systems and methods for direct navigation to and/or highlighting a specific portion of a target document such as query-relevant portion of the document are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
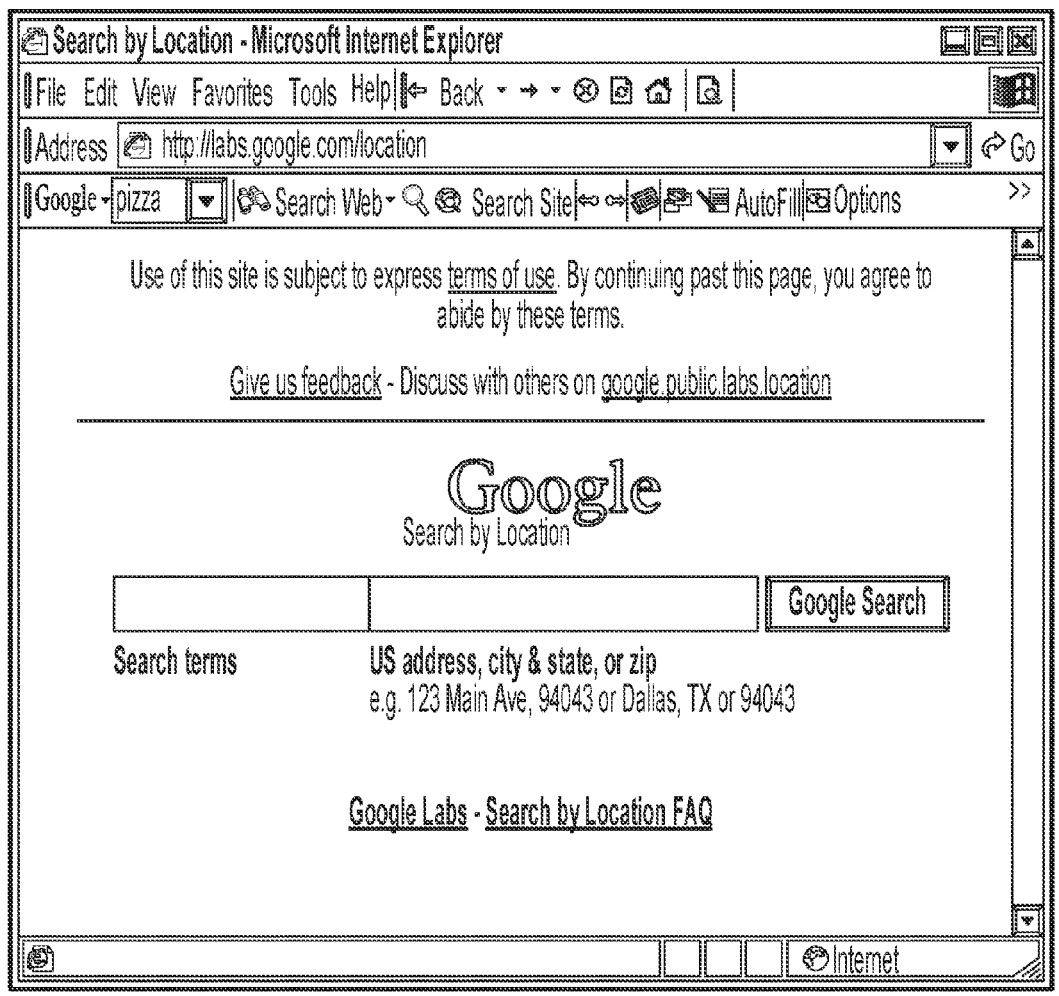
FIG. 1 is an illustrative client browser window displaying a search engine interface for entering a query.
Figure 2:
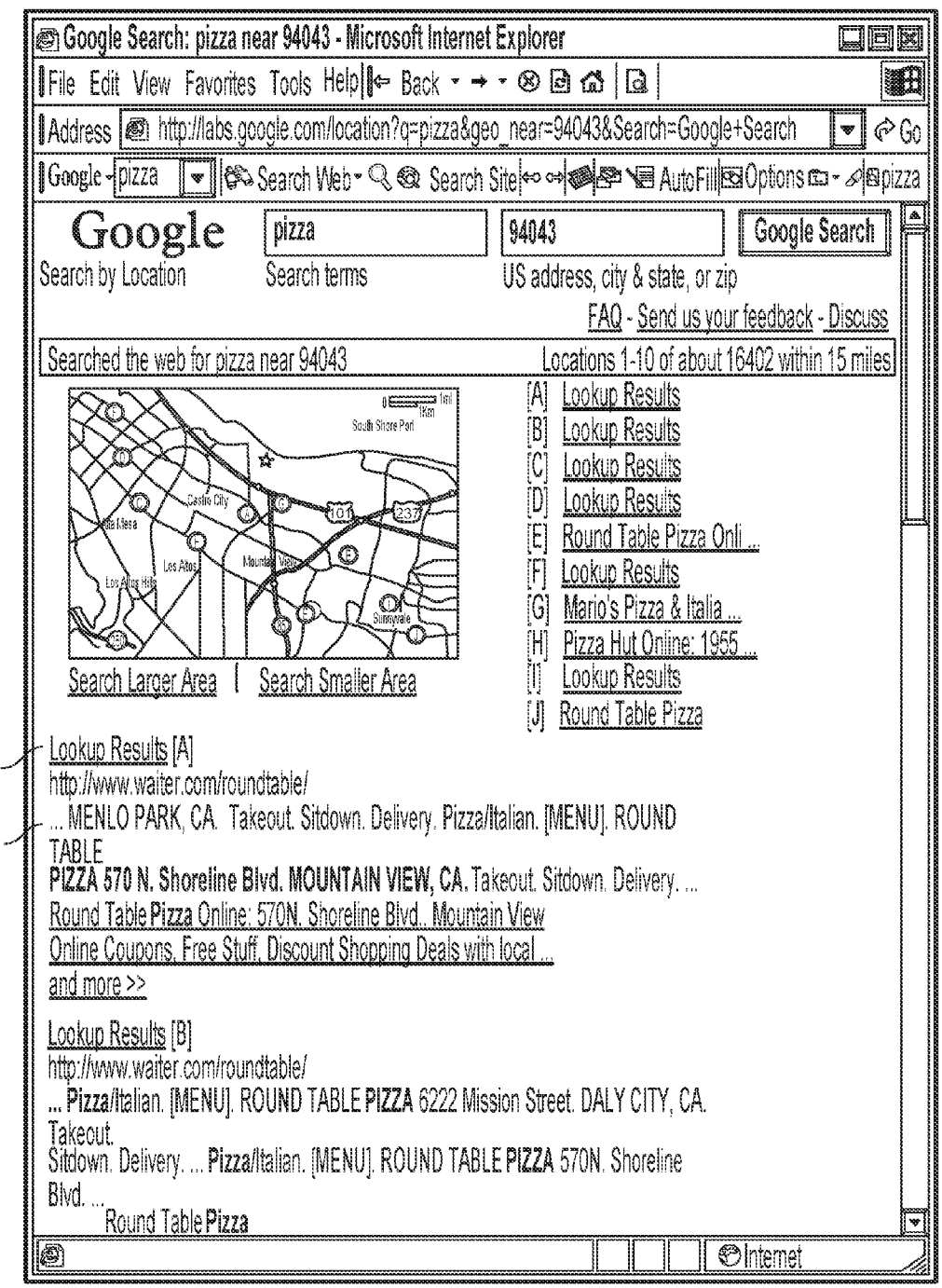
FIG. 2 is an illustrative client browser window displaying search results.
Figure 3:
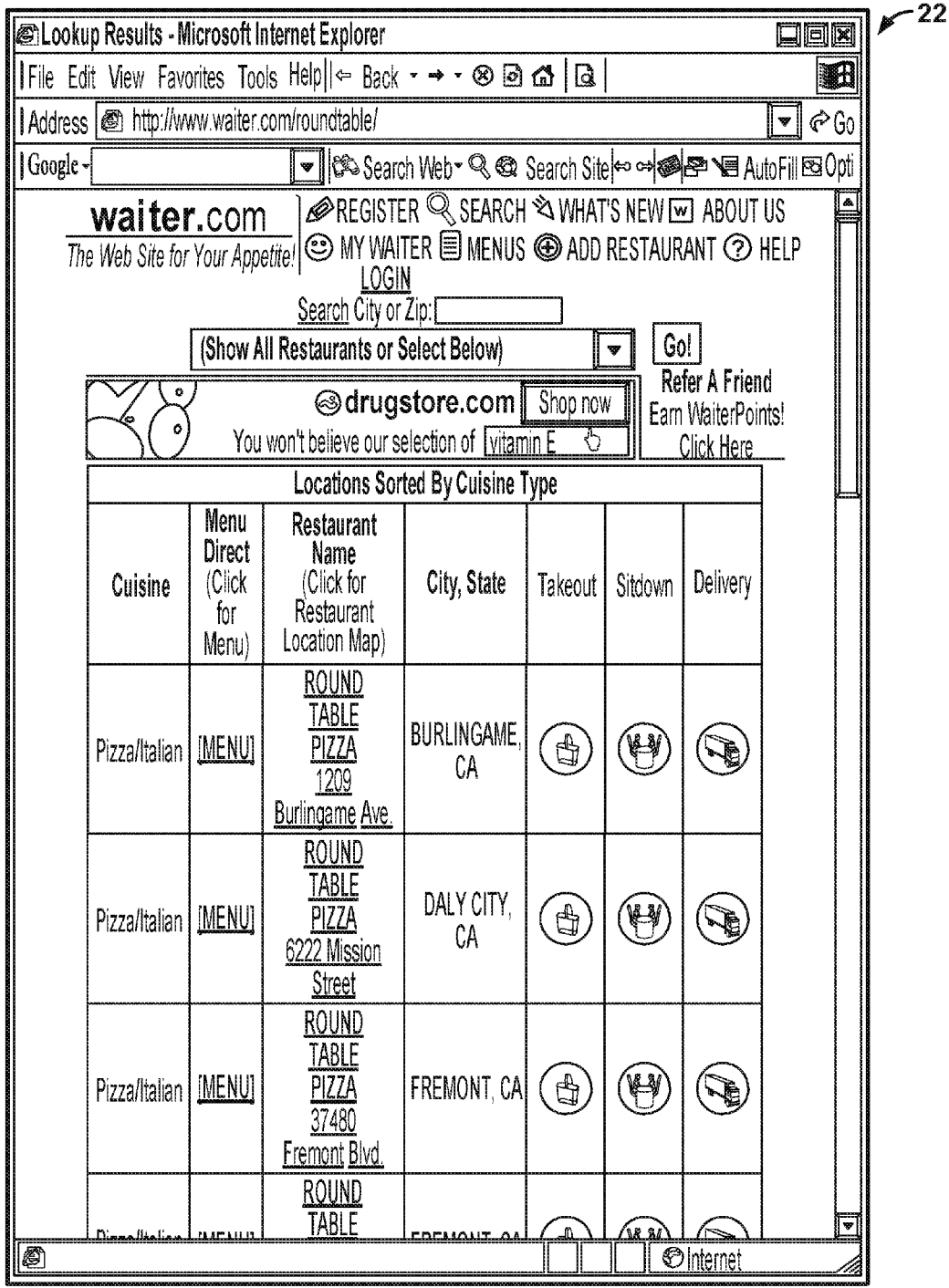
FIG. 3 is an illustrative client browser window displaying a webpage to which a search result hyperlink refers at the top of the webpage.

As discussed above, FIG. 1 is an illustrative client browser window displaying the interface for a Google search engine that searches by location. FIG. 2 is an illustrative client browser window displaying the search results in response to a query for "pizza" and "94043." in which the first hyperlink 20 points to http://www.waiter.com/roundtable/ that contains a list of pizza restaurants. In addition to the various hyperlinks, the search engine also provides a snippet 26 extracted from the webpage to which each hyperlink refers. As shown, certain text of each snippet 26 is in bold font so as to highlight certain text that may be useful as determined by the search engine. As an example, for the first hyperlink 20, the search engine highlights the query relevant text "Pizza 570 N. Shoreline Blvd. MOUNTAIN VIEW, Calif." of the snippet 26 in bold. Conventionally, the user may click on the first hyperlink 20 to cause the browser to navigate to the top of the webpage to which the hyperlink 20 refers, as shown in FIG. 3. The user may then scroll down to find and determine which of the 35 listed pizza restaurants is the one closest to or located in zip code 94043 within the webpage 22 as shown in FIG. 4. Alternatively, the user may take note of the content of the snippet in the results page (FIG. 2) before navigating from the results page to the destination webpage and then search for (either by scrolling or by performing a text search from within the browser) the content of the snippet.

Conventional named anchors are added by webpage authors to allow users to navigate directly to a specific part or location within the webpage. For example, the webpage author may create a named anchor with <A NAME=location> Location </A> at the specific part of the webpage to which the reader can navigate directly from another part of the same webpage or from a different webpage. The NAME attribute names a section, e.g., text or image, so that other links can reference it via a clickable HREF link containing a pound sign "#" followed by the anchor name. In particular, the same or different webpage may include a clickable HREF link: <A href="[URL]#location> Jump to Location </A>, where [URL] is the URL of the target webpage. The HREF attribute specifies the URL address to which the browser is to navigate when the user clicks on the HREF link, i.e., "Jump to Location." Note that using the HREF link containing an anchor name requires that the author of the webpage to have created the named anchor. If a named anchor does not exist for the specific part of the webpage, then the HREF link cannot be used to allow the reader to navigate directly to that specific part of the webpage. If an HREF link refers to a non-existent anchor, the browser simply navigates to the top of the target webpage.

With systems and methods described herein, mechanisms are provided to generate or simulate links with artificial named anchors and to allow the browser to recognize the artificial named anchor and navigate directly to the desired specific part of the target webpage even when the author of the webpage has not created a named anchor at the specific part of the webpage. In particular, the systems and methods described herein simulate the general functionality of the named anchor and the HREF link to provide links containing artificial named anchors that allow navigation directly to a specific part of the target webpage even when a named anchor does not exist at the specific part of the target webpage. Such links can be utilized by any webpage to provide a link to a specific part of another target webpage. In particular, such links containing artificial named anchors can be particularly useful for search result pages returned by search engines.

The systems and methods described herein may be utilized to navigate any document that may be provided from any suitable source as the Internet, an intranet, or local memory, for example. The term URL as used herein generally refers to a locator or address for any document, not necessarily only those available on the Internet. Suitable target or destination documents are typically those displayable by a client browser, typically a client web browser, such as an Internet Explorer, Netscape, Opera, or Mozilla browser.

Referring again to the example described above with reference to FIGS. 1-4, the search results page returned by the search engine may provide or otherwise simulate links to a specific part of a target webpage such as the part of the target webpage that includes at least a portion of the snippet 26 or to a portion that the server or search engine determined to be similar or otherwise relevant. Thus when the user clicks on a portion of the snippet 26, for example, the browser may navigate directly to the part of the target webpage 22 that includes the portion of the snippet 26, as shown in FIG. 5.

To further draw the user's attention to the query-relevant listing 24 in the target webpage 22, at least some of the snippet, e.g., "570 N. Shoreline," may be highlighted. For example, a specific portion may be highlighted, i.e., draw attention to or otherwise emphasize, by modifying the format of the specific portion such as by underlining, bolding, italicizing, foreground and/or background color changing, font and/or size changing, border drawing, text animating (e.g., "marching red ants", etc.), aligning, kerning, style editing/adding/removing. The formatting change may help draw the user's attention to the specific portion by rendering the specific portion inconsistent or distinct from other parts of the document, site, etc. Additionally or alternatively, information in the target document may be modified, for example, by adding, removing or editing relevant (or irrelevant) information, such as by scrolling to, altering or adding a link, adding an image, deleting surrounding aspect, adding new text, adding a popup or hover window, adding and/or executing JavaScript instructions and/or other computing instructions in other languages or methods. The information change may add links to relevant information known to the source page, to provide a method of returning to the source page, to add known links to the target page, etc.

In one embodiment of the present invention, navigation by the browser directly to the specified query-relevant intra-document portion is implemented on the client side while an instruction to the client browser to navigate directly to the intra-document portion is provided by a source, e.g., a server or search engine, providing the clickable link. In particular, in one embodiment of the invention the client browser has installed therein an artificial named anchor module that may be implemented via a toolbar such as the Google toolbar, a dynamic link library (DLL) or any other type of plug-in, a browser helper object (BHO), or any other suitable mechanism to implement the desired functionality in the browser. Note that the functionality need not be implemented using a module and that the browser, shell or Word document viewer, etc. can implement the functionality natively without an add-on. The artificial named anchor module enables the browser to recognize when an URL includes an artificial named anchor. In one embodiment, the artificial named anchor module may be implemented to recognize as artificial any named anchor that begins with a preassigned, artificial named anchor prefix. For example, any set of suitable preassigned text characters may be utilized as the preassigned anchor prefix. In one embodiment of the invention, the preassigned anchor prefix is relatively obscure so as to reduce the likelihood of conflicts with actual anchors in the destination webpage. Any other suitable mechanism for recognizing an artificial named anchor may be utilized. As an example, the preassigned text characters may appear anywhere within the name of the artificial anchor, e.g., as a suffix or anywhere within the artificial anchor.

In the example shown in FIG. 5, "_g_" is used as the pre-assigned artificial named anchor prefix. As shown in the address bar 28 in FIG. 5, the URL the client browser received is http://www.waiter.com/roundtable#_g_570+N.+Shoreline. As is evident, the URL references an artificial named anchor "_g_570 N. Shoreline" although the target webpage may or may not include such an anchor. Upon recognizing that the named anchor is artificial, the browser parses or strips the preassigned artificial prefix, e.g., _g_, from the artificial anchor and searches for the remaining artificial anchor text (e.g., "570 N. Shoreline") in the target webpage. If the remaining artificial anchor text is not located, the browser may display the webpage at the top. Alternatively, if the remaining anchor text is located, the browser may navigate directly to the portion of the webpage containing the remaining anchor text and may also highlight the text. In the above example, the remaining anchor text is the same as the intra-document portion of the target webpage. It is noted the artificial anchor text may optionally be encoded such that the client browser may unencode the artificial anchor text to extract the artificial anchor text before navigating directly to the intra-document portion of the target webpage. In other implementations, different or no encoding mechanisms can be employed.

Figure 6:
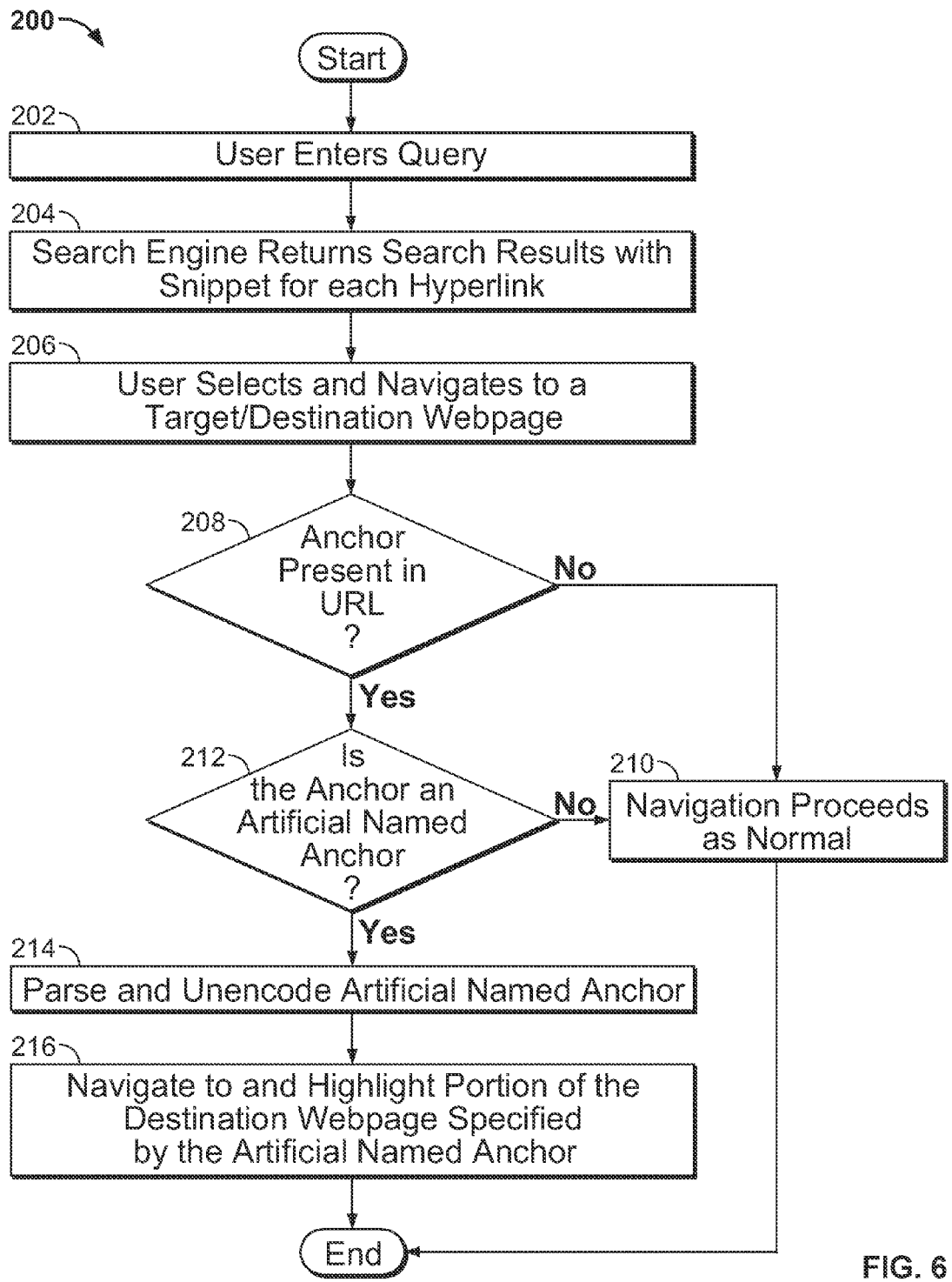
FIG. 6 is a flowchart of an illustrative client-side process for automatically scrolling to and highlighting the query-relevant information of the webpage.

As is evident, the client-side process may be implemented via the artificial named anchor module installed in the browser. FIG. 6 is a flowchart of an illustrative client-side process 200 for recognizing and processing artificial named anchors and navigating directly to and highlighting the query-relevant portion of the webpage. The process 200 begins with the user entering a query via a search engine interface at block 202. At block 204, the search engine returns the search results typically with one or more snippets for each hyperlink. At block 206, the user selects from the search results and clicks on a selected hyperlink to navigate to a target or destination webpage to which the hyperlink refers. It is noted that for each given search result, the search results page may provide any number of hyperlinks, optionally with reference to an artificial anchor. It is noted that certain search results may not provide a hyperlink that references an artificial named anchor as may be the case where the target is a PDF document, for example. Currently, the browser only displays a PDF document at the top of the document although the browser may be similarly modified so as to be able to search and navigate within the PDF document. A similar mechanism may also be implemented for Word, Excel, and/or various other documents with segmentable and/or searchable pieces.

At block 208, the browser determines if the selected hyperlink references a named anchor. If not, then the navigation proceeds as normal at block 210. Alternatively, if the selected hyperlink references a named anchor, then the browser determines if the named anchor is an artificial anchor at block 212. As noted above, the browser may determine that an anchor is artificial if the anchor begins with a preassigned artificial anchor prefix e.g., —g—. If the browser determines that the anchor is not artificial, then the navigation proceeds as normal at block 210. Alternatively, if the browser determines that the anchor is artificial, then the browser may parse and optionally unencode the artificial anchor at block 214. In other implementations, different or no encoding mechanisms can be employed. For example, the browser may strip the artificial anchor of the preassigned anchor prefix, e.g., —g—. The browser then loads the destination webpage and directly navigates to and may also highlight, such as by modifying the formatting of and/or information in the portion of the destination webpage specified by the artificial anchor at block 216. In effect, the browser typically would find, highlight and scroll to the first instance of the portion of the destination webpage specified by the artificial anchor.

It is noted that in one embodiment of the present invention if the client web browser does not have artificial named anchor module installed, then the browser will default to ignoring the artificial named anchor as such an anchor would not exist in the actual target webpage. However, if the client web browser (or the client device in general) does have the appropriate artificial named anchor module installed, the artificial named anchor module will process artificial anchors according to the exemplary client-side process 200 described above. Thus, the artificial anchor serves as an instruction to the artificial named anchor module or to the client browser in general.

The client-side process 200 may allow any source (referral webpage or document) to utilize the artificial named anchor mechanism such that any client device with the artificial named anchor module installed would perform the artificial anchor recognition and processing process 200 to navigate directly to the portion of the target webpage referenced by the artificial anchor. Alternatively, the artificial named anchor module may additionally examine the source (referral webpage) of a hyperlink with an artificial named anchor and only process those whose source is authorized. For example, the client process may determine whether a source is authorized by sniffing an appropriate cookie or by use of headers, for example.

Artificial anchors are generally most useful for searching for text within the target webpage. However, other items to be displayed in the browser and/or otherwise defined by the target webpage may also be searched. Examples include image name, tag identification (ID), tag name, location in the document object model (DOM), HTML byte offset, a general offset or location definition within the search result document, etc. In addition to using artificial anchors to find, highlight and scroll to the referenced text or other portion of the target webpage, the client-side process may alternatively or additionally perform other functions. For example, the client-side process may be implemented to find and highlight occurrences of specific words within the target webpage, e.g., by using a different preassigned artificial anchor prefix such as "_gh_." Thus, multiple occurrences of the specific word(s) or phrase(s) being searched would be highlighted. As another example, the client-side process may be implemented to find and scroll to a specified image based on, for example, the image name, within the target webpage, e.g., by using a different preassigned artificial anchor prefix such as "_gi_." In addition, the artificial anchor module of the client device may alternatively perform a fuzzy (best effort) search rather than an absolute or strict search when searching for the specific portion referred to by the artificial anchor.

Figure 7:
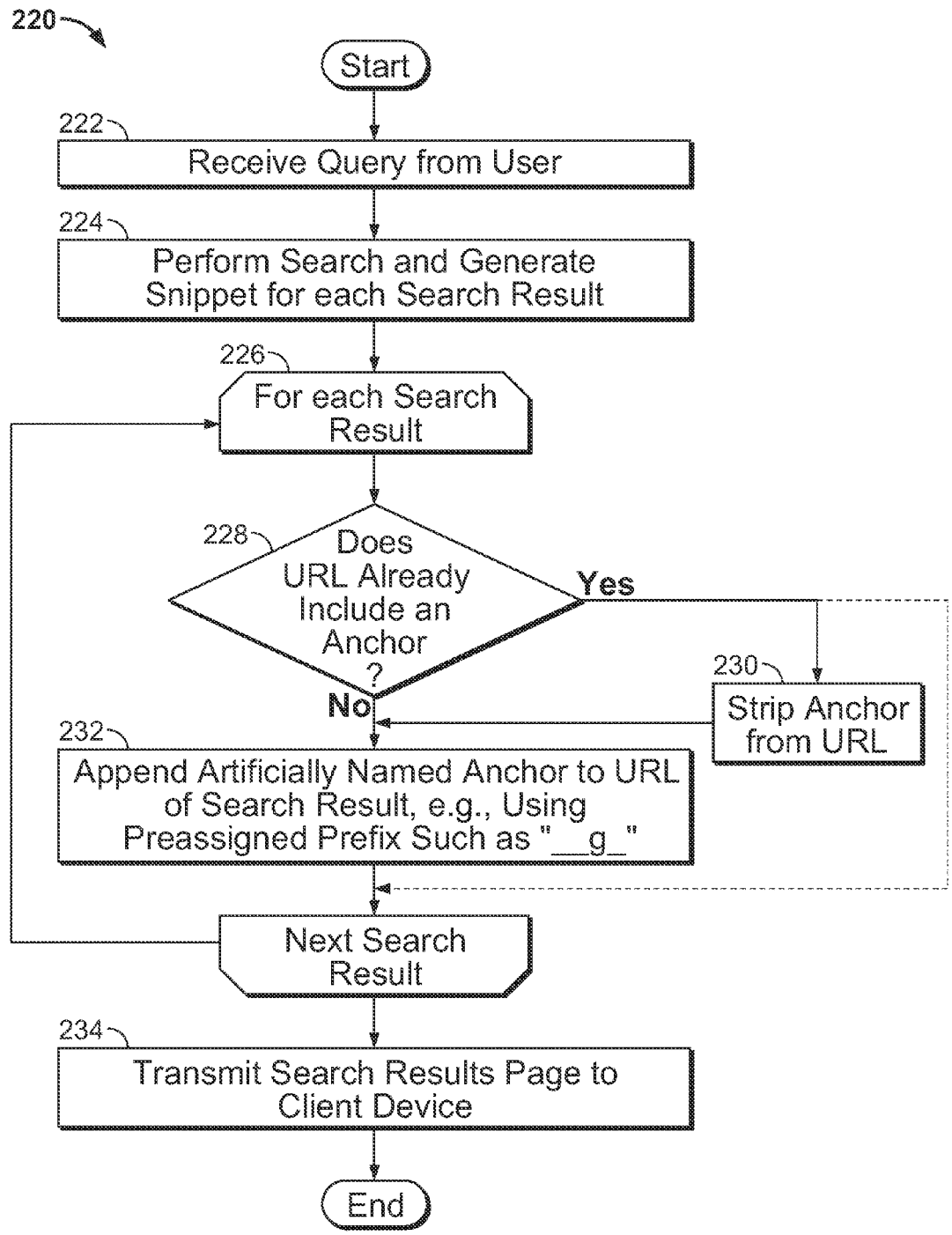
FIG. 7 is a flowchart of an illustrative server-side process for generating and inserting an artificial named anchor in the URL of each search result.

While the artificial anchors are recognized and processed by the client-side process 200, in one embodiment the artificial anchors are generated by a server-side process although a client-side process may be similarly implemented. FIG. 7 is a flowchart of an illustrative search engine server-side process 220 for generating and appending an artificial anchor to the URL of the search result. In particular, at block 222, the search engine receives a query from the user. At block 224, the search engine performs the search and generates the search result. Each search result may include an URL or hyperlink referencing a target or destination webpage and one or more snippets extracted from the target webpage to which the corresponding hyperlink refers. Any suitable search methodology may be employed in block 224.

For each search result 226, the search engine may determine whether the search result hyperlink already includes or references an anchor at block 228. Search engines typically do not return hyperlinks with anchors as anchors are generally not indexed. If such is the case, block 228 may be eliminated. If the URL already includes an anchor, then the search engine may continue onto the next search result at 226. Alternatively, the search engine may strip the anchor from the URL at block 230.

If the search result URL already includes an anchor and the search engine performs block 230 or if the search result URL does not include an anchor, then the search engine generates a modified search result URL by appending an artificial named anchor to the search result URL at block 232. For example, the search engine may use a preassigned artificial anchor prefix such as "_g_" or any other mechanism to signal to the client device that the named anchor is artificially generated.

As noted above, each search result may include a search result hyperlink referencing the target webpage and one or more snippets extracted from the target webpage to which the hyperlink refers. When there are multiple snippets associated with a given search result, the snippets are typically separated an ellipsis, such as a three-dot ellipsis. The search engine may transform each snippet into at least one active snippet in which each active snippet is a hyperlink with an artificial anchor that references the portion of the target webpage containing the corresponding snippet or portion of the snippet. For example, each snippet may optionally be parsed into multiple snippet segments in which the search engine transforms each snippet segment into a separate hyperlink each with a corresponding artificial anchor. In one embodiment, the snippet may be segmented in accordance with punctuation marks that the snippet contains. In an alternative embodiment, the active snippet may link to an artificial anchor that simply points to the search term or phrase, for example.

After the search engine generates the hyperlink with the artificial anchor, the process 220 then continues with the next search result at 226. After all search results have been processed, the search engine server transmits the search results page to the client device at block 234.

Figure 8:
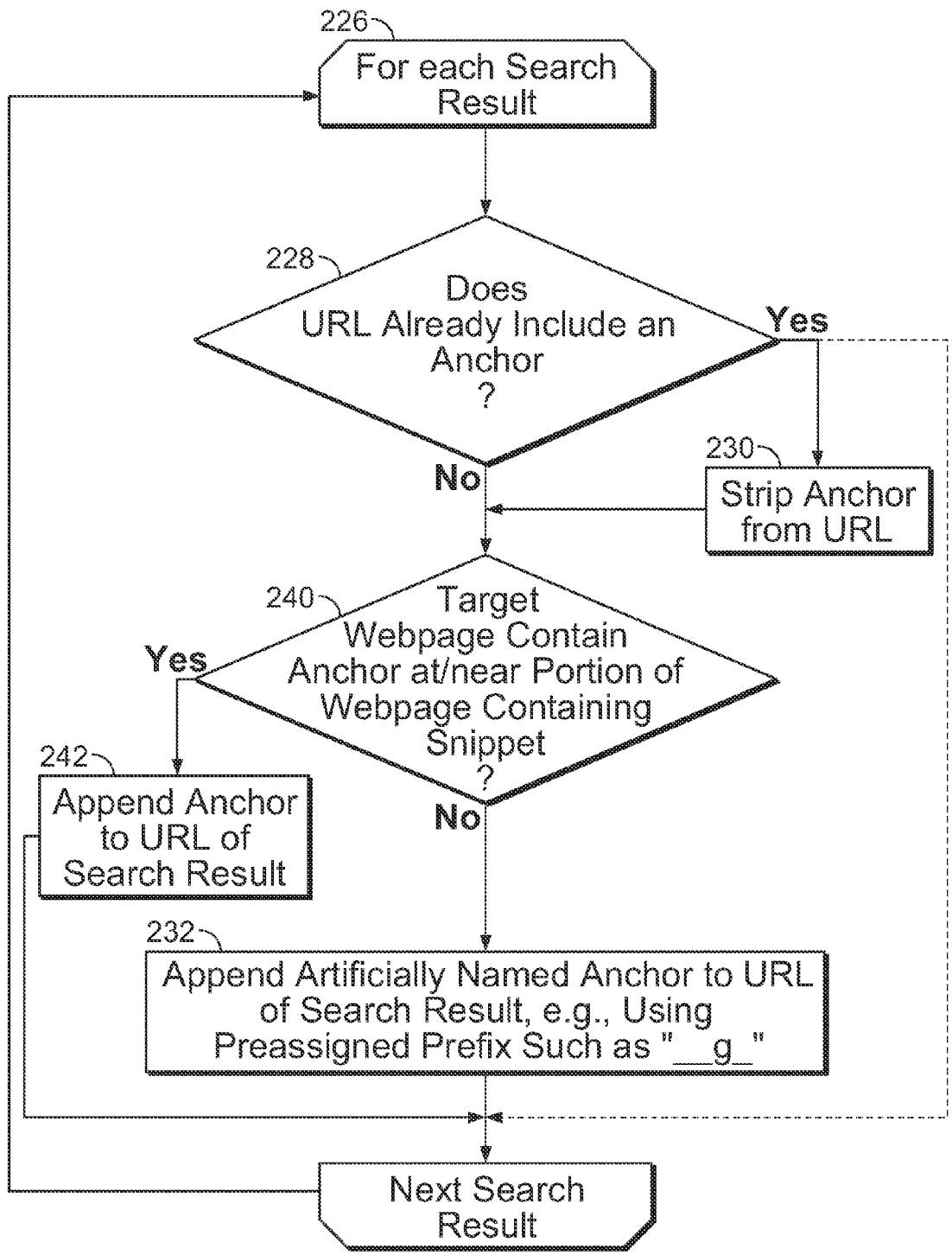
FIG. 8 is a flowchart of a modified portion of the process shown in FIG. 7 in which the search engine also determines if the target webpage already contains a named anchor at or near the snippet.

In one alternative embodiment, the search engine may also determine if the target webpage already contains a named anchor at or near the snippet, either before or instead of performing block 232 as shown in the flowchart of FIG. 8 illustrating a modified portion of the process 220. As shown, after determining that the URL does not already include an anchor at block 228, the search engine may determine if the target webpage already contains a named anchor at or near the snippet at block 240. Block 240 may be performed before or instead of block 232. If the target webpage already contains a named anchor at or near the snippet as determined in block 240, then the search engine utilizes that anchor by appending the anchor to the URL of the search result at block 242 and the process continues with the next search result.

Process 220 may be implemented on the server side although it may be alternatively or additionally implemented on the client side such as via the client-side artificial anchor module or other suitable mechanism. When the process of generating artificial anchors is implemented on the client side and/or when the artificial anchor generation process is not implemented by the search engine utilized by the user, the client-side process may examine each snippet in each search result and generate a hyperlink referencing an artificial named anchor.

As is evident, the combination of generating artificial anchors and recognizing and processing artificial anchors improves the user's web browsing experience by allowing the user to navigate directly to a specific intra-document portion of the target document or webpage corresponding to the relevant snippet. The artificial anchors can be used with any suitable search results such as the Google's standard search, Geo-Search, Froogle search, etc.

The use of artificial anchors is merely one embodiment. For example, the server may provide hints or instructions to the client browser by inserting hidden tags in the results page or attributes on the A tags. The installed browser module on the client side skims the DOM of each results page and extracts the relevant information from these hints or instructions. Thus, when the user navigates to a target webpage or document, the installed browser module applies the desired result of these instructions to achieve similar functions. Client web browsers that do not expect such instructions, i.e., without the appropriate module installed, for example, would simply ignore the instructions. In such an embodiment, the user would not see an artificial anchor appended to the URL in the address bar of the client browser.

In one embodiment, to minimize the impact of transmitting extra information from the server that will only be ignored by the client device or more specifically the client browser if the client device is not installed with the artificial anchor module, the server may sniff the relevant cookie on the client device and determine if the artificial anchor module is installed. To facilitate such a process, installation of the artificial anchor module may cause the relevant cookie to be created and modified. If the artificial anchor module is not installed, then the server, e.g., search engine, is informed that the artificial anchor module is not installed when the query is submitted and the search engine may proceed with the search without generating references to artificial links, for example.

In an alternative embodiment, the mechanism for automatically scrolling to a specific portion of a target page may be implemented on the server side. With server side implementation, a client side artificial anchor module may not be needed. For example, in response to the user clicking on a particular snippet line, the server returns a cached page directly scrolled to a portion of the target document corresponding to the selected snipped. In one embodiment, the search query itself and the particular snippet line number are provided to the server when the user clicking on a particular snippet line. The server then regenerates the snippets, i.e., rerun the snippet generation algorithm, and return the cached page using, for example, JavaScript or other mechanism to automatically scroll to the portion of the cached page that corresponds to the selected snippet line. As another example, each snippet for a given target page is a link to a portion corresponding to the snippet in a cached page. In particular, the link to the cached page may include the query as well as additional information, e.g., a hint such as in the form of an anchor, to appropriately position or scroll the cached page in the browser using a named anchor. The cached page in turn may include named anchors each prefixing a portion of the cached page corresponding to the snippet. In general, with server side implementation, a server may proxy the target page or an intermediary, e.g., a web proxy or IBMYs Web Intermediary (WBI), may implement the server side functionality.

In one embodiment, the system may be configured such that the browser may simultaneously display all the snippet lines, such as with the use of multiple frames each with at least one of the snippet lines visible within the browser. Alternatively, the server may be configured so as to return a cached page within one or more frames within a frame set with each frame scrolled to display one of the snippet lines. For example, where a snippet generation engine returns three snippet lines, the browser may contain three frames within a frame set, with each frame displaying the same target or cached page and each scrolled to a different corresponding one of the snippet lines so as to simultaneously display all of the snippet lines generated by the snippet engine.

Figure 9:
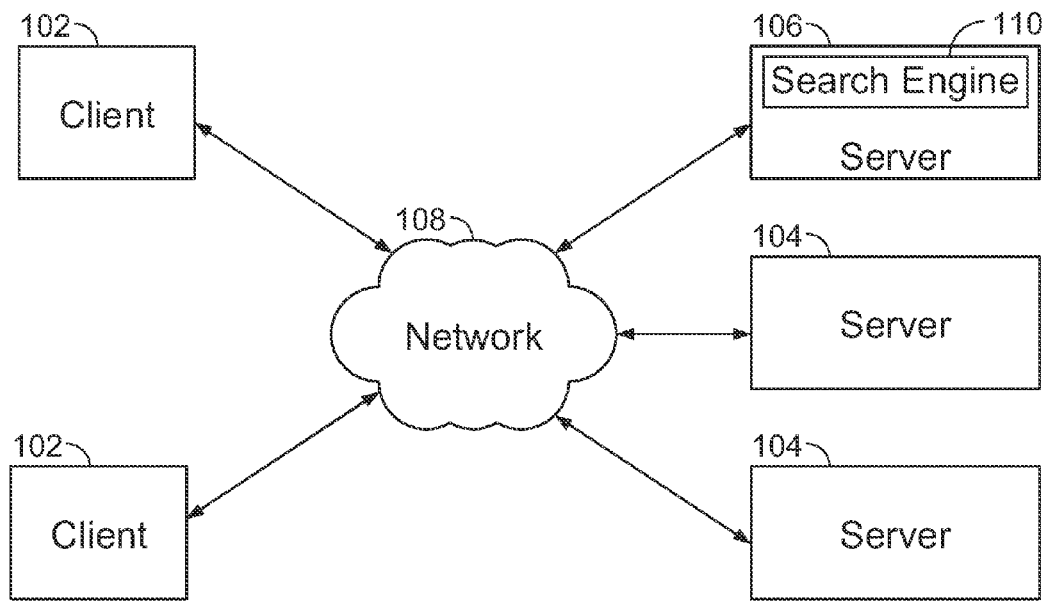
FIG. 9 is a block diagram of an illustrative network system.

FIG. 9 illustrates an exemplary networked system 100 in which systems and methods described herein may be implemented. The networked system 100 may include client devices 102 in communication with servers 104 and 106 via a network 108. The network 108 may be a local area network (LAN), a wide area network (WAN), a telephone network, such as the Public Switched Telephone Network (PSTN), an intranet, the Internet, or any suitable combination of networks. For purposes of clarity, two client devices 102 and three servers 104 and 106 are illustrated as connected to the network 140. However, any suitable number of client devices 102 and servers 104, 106 may be connected via the network 140. In addition, a given client device may perform the functions of a server and a server may perform the functions of a client device. The client devices 102 may include devices, such as mainframes, minicomputers, personal computers, laptops, personal digital assistants, or the like, capable of connecting to the network 108. The client devices 102 may transmit data over the network 108 and/or receive data from the network 108 via a wired (e.g., copper, optical, etc.) and/or wireless connection.

Figure 10:
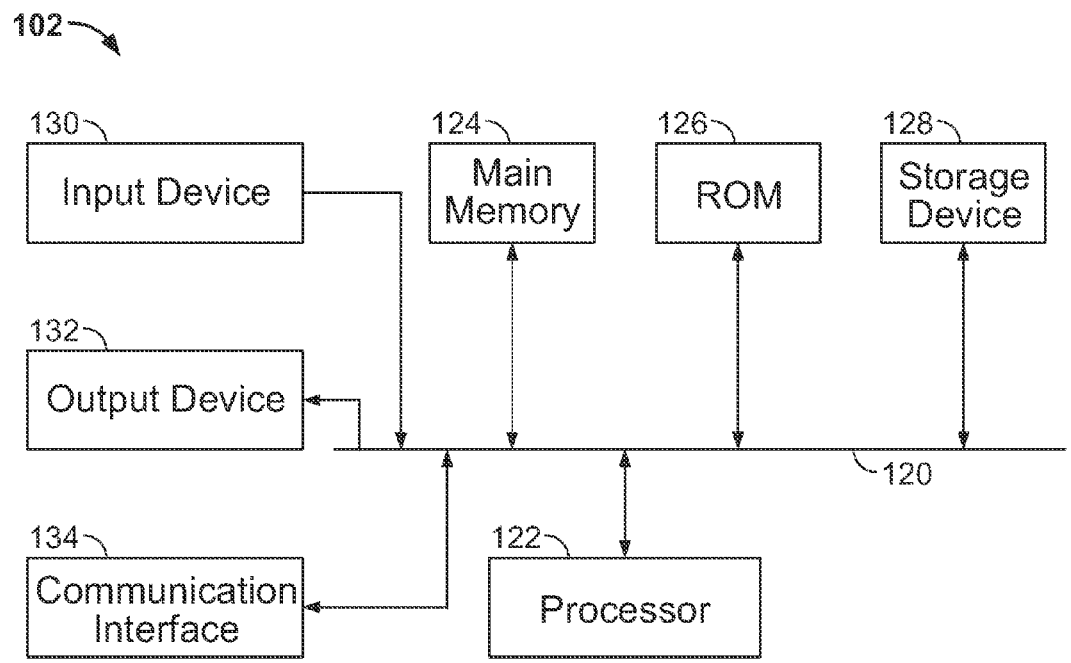
FIG. 10 is a block diagram of an illustrative client device.

FIG. 10 illustrates an exemplary client device 102 suitable for implementation in the networked system 100 of FIG. 9. The client device 102 may include a bus 120, a processor 122, a main memory 124, a read only memory (ROM) 126, a storage device 128, an input device 130, an output device 132, and a communication interface 134. The bus 120 may include one or more conventional buses that permit communication among the components of the client device 102. The processor 122 may include any type of conventional processor or microprocessor that interprets and executes instructions. The main memory 124 may include a random access memory (RAM) or another type of dynamic storage device that stores information and instructions for execution by the processor 122. The ROM 126 may include a conventional ROM device or another type of static storage device that stores static information and instructions for use by the processor 122. The storage device 128 may include a magnetic and/or optical recording medium, for example, and its corresponding drive.

The input device 130 may include one or more conventional mechanisms that permit a user to input information to the client device 102 such as a keyboard, a mouse, a pen, voice recognition and/or biometric mechanisms, etc. The output device 132 may include one or more conventional mechanisms that output information to the user, including a display, a printer, a speaker, etc. The communication interface 134 may include any transceiver-like mechanism that enables the client device 102 to communicate with other devices and/or systems. For example, the communication interface 134 may include mechanisms for communicating with another device or system via a network, such as network 108.

The client devices 102 perform certain searching-related operations such as those described above. The client devices 102 may perform these operations in response to the processor 122 executing software instructions contained in a computer-readable medium, such as memory 124. A computer-readable medium may be defined as one or more memory devices and/or carrier waves. The software instructions may be read into memory 124 from another computer-readable medium such as the data storage device 128 or from another device via the communication interface 134. The software instructions contained in memory 124 causes processor 122 to perform search-related activities described below. Alternatively, hardwired circuitry may be used in place of or in combination with software instructions to implement search-related processes described herein. Thus, the present invention is not limited to any specific combination of hardware circuitry and software.

The servers 104 and 106 may include one or more types of computer systems, such as a mainframe, minicomputer, or personal computer capable of connecting to the network 108 to enable servers 104, 106 to communicate with the client devices 102. In alternative implementations, the servers 104, 106 may include mechanisms for directly connecting to one or more client devices 102. The servers 104, 106 may transmit data over the network 108 or receive data from the network 108 via a wired or wireless connection.

The servers may be configured in a manner similar to that described above in reference to FIG. 10 for client device 102. In one implementation, the server 106 may include a search engine 110 usable by the client devices 102. The servers 104 may store documents (e.g., web pages) accessible by the client devices 102.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A computer-implemented method, comprising:
    receiving, for each target document of a plurality of target documents that a search engine has identified in response to a query, an address of the target document, the target document including query-relevant text at an intra-document portion of the target document;
    for each address of the target document of the target documents:
        generating an artificial anchor, the artificial anchor corresponding to the intra-document portion of the target document and undefined in the target document;
        appending the artificial anchor to the address of the target document; and
    providing, to a client device, a plurality of search results, wherein each search result of the search results identifies a corresponding target document and includes the address of the target document appended with the artificial anchor as a search result link to the target document;
    wherein the artificial anchor includes a preassigned artificial anchor designator designating the artificial anchor to an artificial anchor module in the client device, and wherein the artificial anchor includes the preassigned artificial anchor designator as either a prefix or a suffix and wherein the preassigned artificial anchor designator includes a preassigned set of text characters, and the artificial anchor designator and artificial anchor are ignored by a client web browser in a client device not having the artificial anchor module.

2. The method of claim 1, wherein the artificial anchor comprises an instruction for an artificial anchor module in a document browser on a client device to navigate directly to the intra-document portion of the target document when the target document is displayed on a client device.

3. The method of claim 1, wherein:
    the address of the target document comprises a uniform resource locator that specifies the location of the target document; and
    appending the artificial anchor to the address comprises appending the artificial anchor to the uniform resource locator.

4. The method of claim 1, wherein the artificial anchor includes query-relevant text from the intra-document portion of the target document.

5. The method of claim 1, wherein each search result that identifies a target document includes:
    a search result document link to a top of a corresponding target document, the search result document link including the address of the target document; and
    an active snippet link to the intra-document portion of the target document, the active snippet link including a query-relevant snippet, the query-relevant snippet being text extracted from query-relevant text, the active snippet link including the address of the target document appended with the artificial anchor.

6. The method of claim 1, wherein:
    the artificial anchor comprises an instruction for an artificial anchor module in a document browser on a client device to navigate directly to the intra-document portion of the target document when the target document is displayed on a client device, and the artificial anchor includes query relevant text from the intra-document portion of the target document; and
    appending the artificial anchor comprises appending the artificial anchor to a uniform resource locator that specifies the location of the target document.

7. The method of claim 6, wherein each search result that identifies a target document includes:
    a search result document link to a top of a corresponding target document, the search result document link including the address of the target document; and
    an active snippet link to the intra-document portion of the target document, the active snippet link including a query-relevant snippet, the query-relevant snippet being text extracted from query-relevant text, the active snippet link including the address of the target document appended with the artificial anchor.

8. A computer program product embodied on a non-transitory computer-readable medium, the computer program product including instructions, which when executed by a computer system, are operable to cause the computer system to perform acts comprising:
    receiving, for each target document of a plurality of target documents that a search engine has identified in response to a query, an address of the target document, the target document including query-relevant text at an intra-document portion of the target document;
    for each address of the target document of the target documents:
        generating an artificial anchor, the artificial anchor corresponding to the intra-document portion of the target document and undefined in the target document;
        appending the artificial anchor to the address of the target document; and
    providing, to a client device, a plurality of search results, wherein each search result of the search results identifies a corresponding target document and includes the address of the target document appended with the artificial anchor as a search result link to the target document;

wherein the artificial anchor includes a preassigned artificial anchor designator designating the artificial anchor to an artificial anchor module in the client device, wherein the artificial anchor includes the preassigned artificial anchor designator as either a prefix or a suffix and wherein the preassigned artificial anchor designator includes a preassigned set of text characters and the artificial anchor designator and the artificial anchor are ignored by a client web browser in a client device not having the artificial anchor module.

9. The computer program product of claim 8, wherein the artificial anchor comprises an instruction for an artificial anchor module in a document browser on a client device to navigate directly to the intra-document portion of the target document when the target document is displayed on a client device.

10. The computer program product of claim 8, wherein:
the address of the target document comprises a uniform resource locator that specifies the location of the target document; and
appending the artificial anchor to the address comprises appending the artificial anchor to the uniform resource locator.

11. The computer program product of claim 8, wherein the artificial anchor includes query-relevant text from the intra-document portion of the target document.

12. The computer program product of claim 8, wherein each search result that identifies a target document includes:
a search result document link to a top of a corresponding target document, the search result document link including the address of the target document; and
an active snippet link to the intra-document portion of the target document, the active snippet link including a query-relevant snippet, the query-relevant snippet being text extracted from query-relevant text, the active snippet link including the address of the target document appended with the artificial anchor.

13. The computer program product of claim 8, wherein:
the artificial anchor comprises an instruction for an artificial anchor module in a document browser on a client device to navigate directly to the intra-document portion of the target document when the target document is displayed on a client device, and the artificial anchor includes query relevant text from the intra-document portion of the target document; and
appending the artificial anchor comprises appending the artificial anchor to a uniform resource locator that specifies the location of the target document.

14. The computer program product of claim 13, wherein each search result that identifies a target document includes:
a search result document link to a top of a corresponding target document, the search result document link including the address of the target document; and
an active snippet link to the intra-document portion of the target document, the active snippet link including a query-relevant snippet, the query-relevant snippet being text extracted from query-relevant text, the active snippet link including the address of the target document appended with the artificial anchor.

15. A system, comprising:
one or more computers including a non-transitory memory device; and
software stored in the memory device in data communication with the one or more computers, the software including instructions executable by the one or more computers and upon such execution cause the one or more computers to perform operations comprising:
receiving, for each target document of a plurality of target documents that a search engine has identified in response to a query, an address of the target document, the target document including query-relevant text at an intra-document portion of the target document;
for each address of the target document of the target documents:
generating an artificial anchor, the artificial anchor corresponding to the intra-document portion of the target document and undefined in the target document;
appending the artificial anchor to the address of the target document; and
providing, to a client device, a plurality of search results, wherein each search result of the search results identifies a corresponding target document and includes the address of the target document appended with the artificial anchor as a search result link to the target document;
wherein the artificial anchor includes a preassigned artificial anchor designator designating the artificial anchor to an artificial anchor module in the client device, wherein the artificial anchor includes the preassigned artificial anchor designator as either a prefix or a suffix and wherein the preassigned artificial anchor designator includes a preassigned set of text characters, and the artificial anchor designator and the artificial anchor are ignored by a client web browser in a client device not having the artificial anchor module.

16. The system of claim 15, wherein the artificial anchor comprises an instruction for an artificial anchor module in a document browser on a client device to navigate directly to the intra-document portion of the target document when the target document is displayed on a client device.

17. The system of claim 15, wherein:
the address of the target document comprises a uniform resource locator that specifies the location of the target document; and
appending the artificial anchor to the address comprises appending the artificial anchor to the uniform resource locator.

18. The system of claim 15, wherein the artificial anchor includes query-relevant text from the intra-document portion of the target document.

19. The system of claim 15, wherein each search result that identifies a target document includes:
a search result document link to a top of a corresponding target document, the search result document link including the address of the target document; and
an active snippet link to the intra-document portion of the target document, the active snippet link including a query-relevant snippet, the query-relevant snippet being text extracted from query-relevant text, the active snippet link including the address of the target document appended with the artificial anchor.

20. The system of claim 15, wherein:
the artificial anchor comprises an instruction for an artificial anchor module in a document browser on a client device to navigate directly to the intra-document portion of the target document when the target document is displayed on a client device, and the artificial anchor includes query relevant text from the intra-document portion of the target document; and appending the artificial anchor comprises appending the artificial anchor to a uniform resource locator that specifies the location of the target document.

21. The system of claim 20, wherein each search result that identifies a target document includes:
- a search result document link to a top of a corresponding target document, the search result document link including the address of the target document; and
- an active snippet link to the intra-document portion of the target document, the active snippet link including a query-relevant snippet, the query-relevant snippet being text extracted from query-relevant text, the active snippet link including the address of the target document appended with the artificial anchor.

* * * * *